(12) United States Patent
Davis

(10) Patent No.: US 9,370,841 B2
(45) Date of Patent: Jun. 21, 2016

(54) ELECTRODE EXTENSION GUIDE FOR USE WITH WELDING SYSTEMS

(71) Applicant: Randall L. Davis, Belpre, OH (US)

(72) Inventor: Randall L. Davis, Belpre, OH (US)

( * ) Notice: Subject to any disclaimer, the term of this patent is extended or adjusted under 35 U.S.C. 154(b) by 234 days.

(21) Appl. No.: 14/047,246

(22) Filed: Oct. 7, 2013

(65) Prior Publication Data

US 2014/0097167 A1 Apr. 10, 2014

Related U.S. Application Data

(60) Provisional application No. 61/745,000, filed on Oct. 9, 2012.

(51) Int. Cl.
| | |
|---|---|
| *B23K 26/00* | (2014.01) |
| *B23K 9/12* | (2006.01) |
| *B23K 9/133* | (2006.01) |
| *B23K 9/28* | (2006.01) |

(52) U.S. Cl.
CPC ................. *B23K 9/123* (2013.01); *B23K 9/133* (2013.01); *B23K 9/28* (2013.01)

(58) Field of Classification Search
CPC ........ B23K 9/12–9/123; B23K 9/133–9/1336; B23K 9/28–9/287
USPC ........................................ 219/137.31–137.61
See application file for complete search history.

(56) References Cited

U.S. PATENT DOCUMENTS

| | | | |
|---|---|---|---|
| 2,965,746 A | 12/1960 | Cresswell | |
| 3,025,387 A | 3/1962 | Kinney | |
| 3,089,022 A | 5/1963 | Kinney | |
| 3,502,841 A * | 3/1970 | Heer | 219/137.61 |
| 3,585,352 A | 6/1971 | Zvanut | |
| 3,597,576 A | 8/1971 | Bernard et al. | |
| 3,878,354 A | 4/1975 | Frantzreb, Sr. | |
| 3,879,093 A * | 4/1975 | Betrix | 384/43 |
| 4,158,763 A | 6/1979 | Moerke | |
| 4,449,281 A * | 5/1984 | Yoshida et al. | 29/421.1 |
| 4,575,612 A | 3/1986 | Prunier | |
| 4,864,098 A * | 9/1989 | Basanese et al. | 219/121.61 |
| 5,420,389 A | 5/1995 | Davies | |
| 5,585,013 A * | 12/1996 | Truty | 219/69.12 |

(Continued)

OTHER PUBLICATIONS

Hinkle, J.E., "Long Stickout Welding; A Practical Way to Increase Deposition Rates", Welding Journal, Nov. 1968, (pp. 869-874), presented at the AWS 49th Annual Meeting held in Chicago, Ill, during Apr. 1-5, 1968.

*Primary Examiner* — Sang Y Paik
(74) *Attorney, Agent, or Firm* — McNees Wallace & Nurick, LLC

(57) ABSTRACT

An electrode extension guide for use with welding systems is provided. This electrode extension guide includes a barrel adapted to be connected to a contact tip, wherein the barrel has a predetermined length, a predetermined outer diameter, a predetermined inner diameter, and a plurality of apertures formed therein, wherein each aperture extends from the outer diameter through to the inner diameter of the barrel, and wherein the inner diameter further defines a channel passing lengthwise through the barrel; a plurality of bearings, wherein each bearing is inserted into one of the apertures formed in the barrel such that the bearing extends a predetermined distance into the channel, and wherein each bearing is electrically non-conductive; and a sleeve disposed around the outer diameter of the barrel along the length thereof, wherein the sleeve is operative to retain the bearings within the apertures at the outer diameter of the barrel.

17 Claims, 2 Drawing Sheets

(56) References Cited

U.S. PATENT DOCUMENTS

| | | |
|---|---|---|
| 5,635,091 A | 6/1997 | Hori et al. |
| 5,721,417 A | 2/1998 | Craig |
| 7,381,923 B2 | 6/2008 | Gordon et al. |
| 2004/0009866 A1* | 1/2004 | Abukawa et al. ............ 501/97.2 |
| 2004/0079741 A1* | 4/2004 | Keegan .................... 219/137.61 |
| 2004/0256382 A1 | 12/2004 | Pilavdzic et al. |

* cited by examiner

FIG. 1
FIG. 2
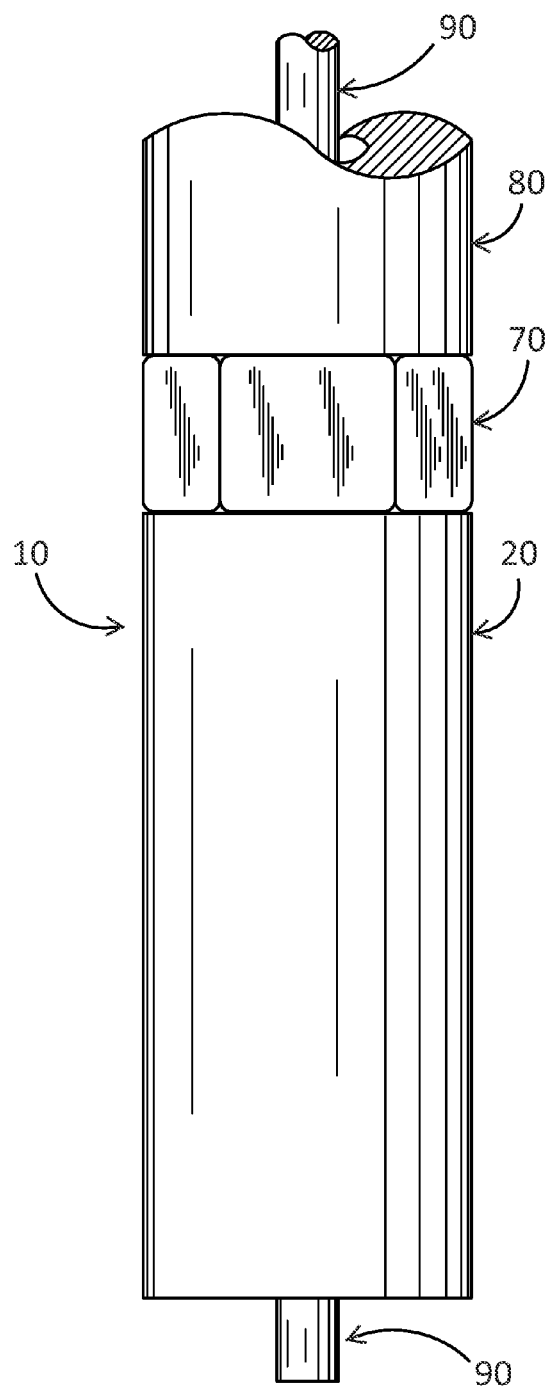
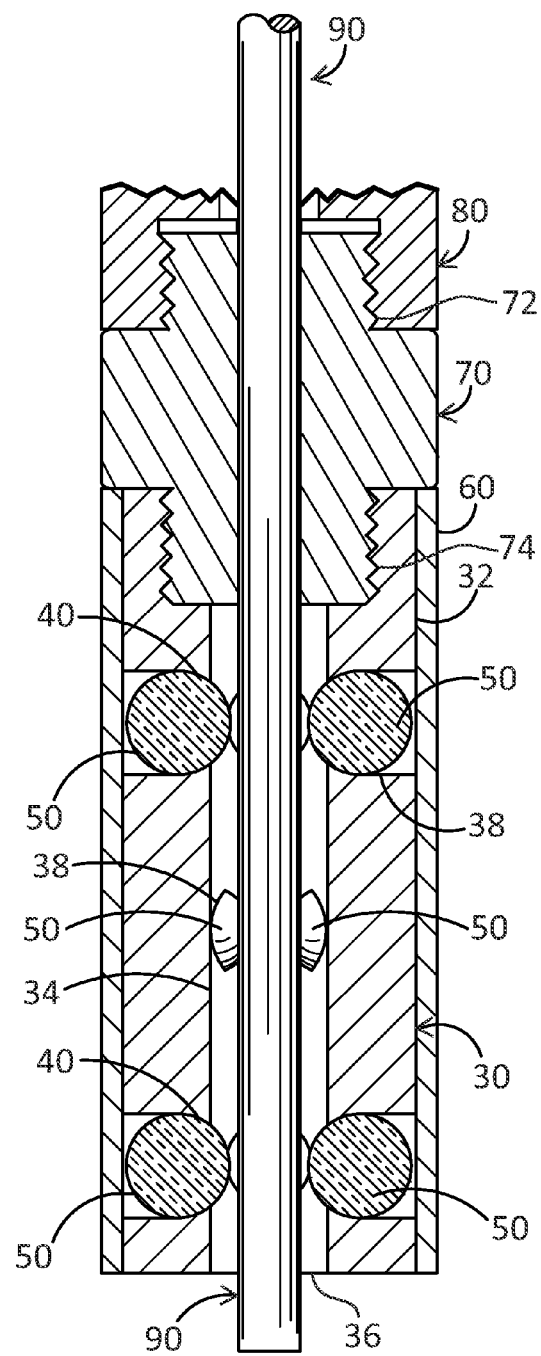

ELECTRODE EXTENSION GUIDE FOR USE WITH WELDING SYSTEMS

CROSS-REFERENCE TO RELATED APPLICATIONS

This patent application claims the benefit of U.S. Provisional Patent Application Ser. No. 61/745,000 filed on Oct. 9, 2012 and entitled "Electrode Extension Guide for Welding," the disclosure of which is hereby incorporated by reference herein in its entirety and made part of the present U.S. utility patent application for all purposes.

BACKGROUND OF THE INVENTION

The described invention relates in general to welding systems, and more specifically to an accessory for use with arc welding systems, wherein the accessory increases the rate at which welding may occur.

Arc welding is a common category of welding that includes, for example, flux-cored arc welding, submerged arc welding, and gas metal arc welding, all of which are used to weld together materials referred to as base metals. These types of arc welding typically involve the use of a power source for generating heat by creating an electric arc between a consumable electrode (which may be a wire or a strip) and the base metals. The electrode and portions of the base metals melt and then fuse together at a welding point between the base metals. The area around the welding point is typically shielded by gas (which is generally inert for welding purposes) or flux for preventing contamination of the molten metal.

Within the context of commercial welding, a primary objective is the completion of any particular welding job in the shortest time possible without sacrificing weld integrity. An increase in the rate of welding may be accomplished by increasing the current delivered to the electrode from the power source. When more electrical energy is induced by increasing the current delivered to the electrode and the arc, the burn-off rate of the electrode and the deposition rate of the weld are increased. However, larger more expensive power sources are often required to sufficiently increase current levels, making this approach generally less attractive from a cost perspective.

Another approach to increasing the welding rate involves increasing the electrode extension. Electric current is carried by the consumable electrode at the point of electrical contact with a contact tip. The current passes through the consumable electrode to the tip of the electrode to the arc. The distance from the point of the final electrical contact with the contact tip to the electrode's tip at the arc is identified as the "electrode extension". The electrode is subject to resistance heating based on the formula $I^2R$, where I equals current and R equals resistance. The longer the length of the electrode from the point of electrical contact to the arc or the smaller the cross section of the electrode, the greater the heat buildup within the electrode. This is due to increased electrical resistance. Electrical contact over the electrode extension must be avoided. An electrode heated to a higher temperature melts faster at the arc than a colder electrode melts given the same power input. One problem with electrode extension welding is that if the electrode extension is too long, the heat buildup within the electrode may become too intense and the electrode may lose its stiffness. Such a loss in columnar strength makes positioning of the electrode at the welding location difficult due to wandering of the tip.

As will be appreciated by one of ordinary skill in the art of welding, the net result of increasing the electrode extension is to make the welding process more efficient. When the electrode extension is increased while keeping the welding current constant, the result is a greater quantity of melted electrode and a smaller quantity of melted base metal. As an example, an unguided electrode extension of ¾ inch to 1 inch is commonly used for 3/32 inch diameter wire for submerged arc welding of carbon steel. Successful welding can be performed with electrode extension guides up to at least 3 inches (with 3/32 inch diameter wire) while providing the same current input. Increases in electrode extension are known to result in significant increases (e.g., greater than 75%) in deposition rate for welds. However, electrode extensions are typically maintained at levels of 20% to 60% deposition rate increase to provide weld integrity in most applications. The burn off rate for a 3/32 inch diameter solid carbon steel electrode at a 1 inch electrode extension and 400 amperes (DC+) is approximately 9.5 pounds per hour. The burn off rate for a 3/32 inch diameter solid carbon steel electrode at 2¼ inch electrode extension and 400 amperes (DC+) is approximately 13.5 pounds per hour. Essentially, the benefits of increased electrode extension are known to include: (i) increased electrode melting rate; (ii) lower base metal heat input resulting in narrower heat affected zones; (iii) lower heat input for better control of temperature between weld passes; and (iv) lower heat input for less distortion.

Certain types of electrode extension guides that are intended to prevent electrical contact between the final electrical contact point and the tip of the electrode are known. These guides incorporate a cylinder in one form or another that serves as a guide and that utilizes ceramic (or other insulating material) to avoid electrical contact with the electrode over the length of extension. Ceramics can provide most of the basic properties required for a successful guide, such as high temperature resistance, high wear resistance at high temperature, high thermal shock resistance, and resistance to the flow of electricity. However, a combination of these properties is possessed only by a relative few ceramics, such as lava and silicon nitride materials, which suffer from certain limitations. For example, lava cannot accommodate the highest levels of amperage required for some welds.

Most ceramics provided in cylindrical form lack the mechanical properties necessary to avoid failure due to breakage in the industrial environment, especially due to the dragging of large, cold electrodes on base metals. Another reason for the breakage of cylindrical ceramic components used as electrode extension guides is a delay in the instantaneous full ignition of the arc at weld initiation. This delay may be caused by poor electrical contact or improper adjustment of startup parameters including the starting wire feed speed rate (also known as 'run in speed'). The mechanical properties of ceramics to be considered for increased durability include tensile strength, impact strength, flexural strength and compressive strength at room temperature and at the elevated temperatures encountered in welding processes. Silicon nitride ceramics possess highly desirable properties (including mechanical properties) when compared to lava and most other available ceramics; however, production of cylindrical forms of silicon nitride useful for electrode extension guides is cost prohibitive. Moreover, cylindrical forms of silicon nitride are still prone to mechanical breakage, especially due to wire dragging.

In addition to certain limitations resulting from the use of the materials previously discussed, existing electrode extension guides suffer from other shortcomings. For example, some guides do not provide adequate guidance to keep the electrode on a narrow line of welding that is often required for a successful weld. Some guides also have a propensity for allowing the heated and softened electrode to collapse within the guide upon weld startup due to excessive inner diameters. Guides with thru holes near in size to the electrode can provide more accurate guidance of the electrode, but are prone to jamming due to the presence of foreign material such as stray welding flux and metal filings produced in the wire feed mechanism. Therefore, there is an ongoing need for an effective, relatively inexpensive, and highly durable electrode extension guide for use in arc welding processes with continuously fed electrodes.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a system for arc welding is provided. This system includes a welding gun that further includes an electrode guide tube, and a contact tip attached to the electrode guide tube; an electrode extension guide connected to the contact tip; and an electrode, wherein the electrode passes through the electrode guide tube, contact tip, and electrode extension guide. The electrode extension guide further includes a barrel having a predetermined length, a predetermined outer diameter, a predetermined inner diameter, and a plurality of apertures formed therein, wherein each aperture in the plurality of apertures extends from the outer diameter through to the inner diameter of the barrel, and wherein the inner diameter further defines a channel passing lengthwise through the barrel; a plurality of substantially spherical bearings, wherein each bearing in the plurality of substantially spherical bearings is inserted into one of the apertures formed in the barrel such that the bearing extends a predetermined distance into the channel, and wherein each bearing is substantially electrically non-conductive; and a sleeve disposed around the outer diameter of the barrel along the length thereof, wherein the sleeve is operative to retain the bearings within the apertures at the outer diameter of the barrel. The plurality of substantially spherical bearings is operative to minimize collapse of the electrode, inhibit the electrode from deviating from a substantially straight path through the barrel, and isolate the electrode from inadvertent electrical contact with any conductive material in the barrel.

In accordance with another aspect of the present invention, an assembly for arc welding is provided. This assembly includes an electrode guide tube adapted to be connected to a welding gun; a contact tip attached to the electrode guide tube; and an electrode extension guide connected to the contact tip. The electrode extension guide further includes a barrel having a predetermined length, a predetermined outer diameter, a predetermined inner diameter, and a plurality of apertures formed therein, wherein each aperture in the plurality of apertures extends from the outer diameter through to the inner diameter of the barrel, and wherein the inner diameter further defines a channel passing lengthwise through the barrel; a plurality of substantially spherical bearings, wherein each bearing in the plurality of substantially spherical bearings is inserted into one of the apertures formed in the barrel such that the bearing extends a predetermined distance into the channel, and wherein each bearing is electrically non-conductive; and a sleeve, wherein the sleeve is disposed around the outer diameter of the barrel along the length thereof, and wherein the sleeve is operative to retain the bearings within the apertures at the outer diameter of the barrel.

In yet another aspect of this invention, an electrode extension guide for use with arc welding systems is provided. This electrode extension guide includes a barrel that is adapted to be connected to a contact tip, wherein the barrel has a predetermined length, a predetermined outer diameter, a predetermined inner diameter, and a plurality of apertures formed therein, wherein each aperture in the plurality of apertures extends from the outer diameter through to the inner diameter of the barrel, and wherein the inner diameter further defines a channel passing lengthwise through the barrel; a plurality of substantially spherical bearings, wherein each bearing in the plurality of substantially spherical bearings is inserted into one of the apertures formed in the barrel such that the bearing extends a predetermined distance into the channel, and wherein each bearing is electrically non-conductive; and a sleeve, wherein the sleeve is disposed around the outer diameter of the barrel along the length thereof, and wherein the sleeve is operative to retain the bearings within the apertures at the outer diameter of the barrel.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 1 is side elevation of an electrode extension guide in accordance with an exemplary embodiment of the present invention;

FIG. 2 is a cross-sectional side view of the electrode extension guide of FIG. 1.

DETAILED DESCRIPTION OF THE INVENTION

Figure 3:
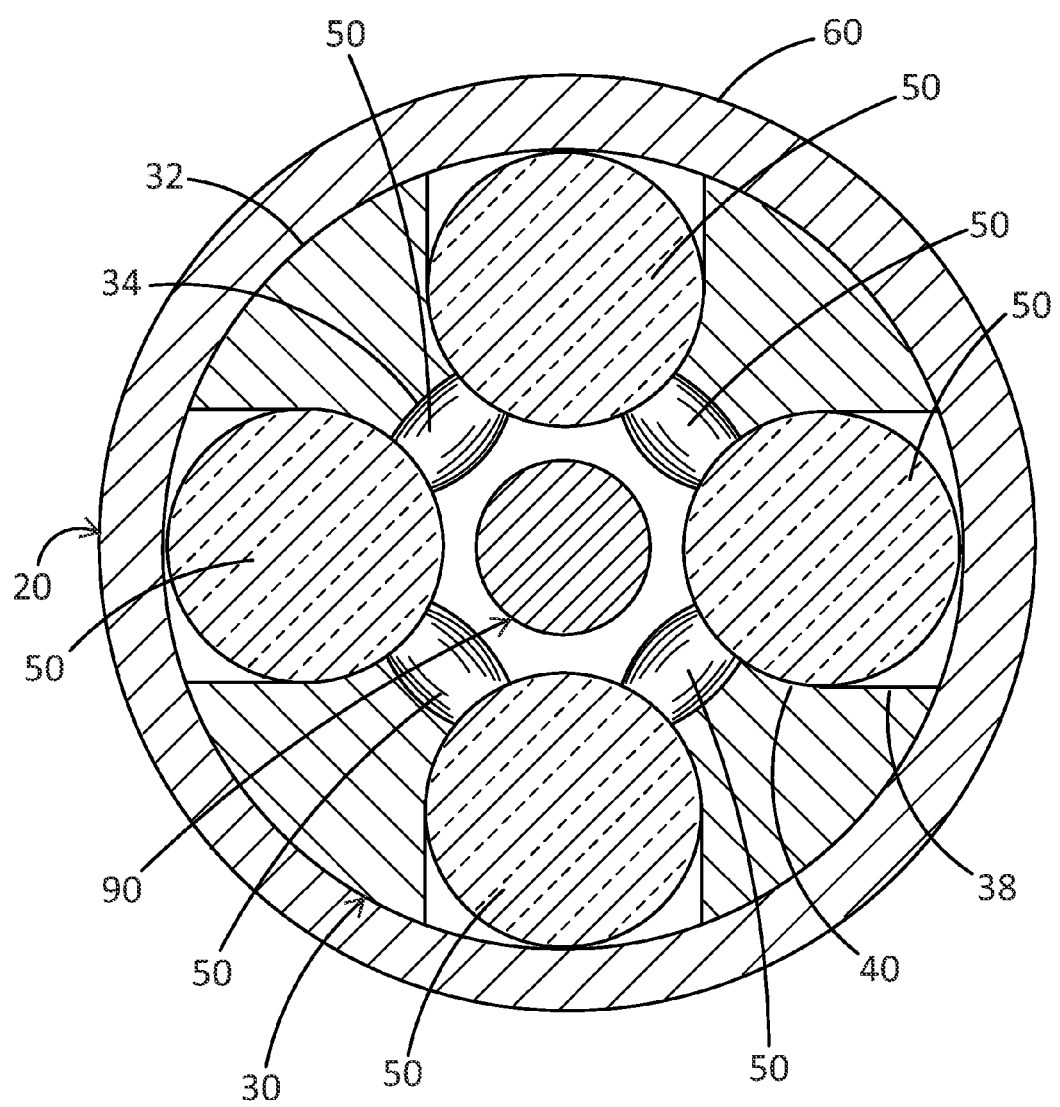
FIG. 3 is a cross-sectional top view of the electrode extension guide of FIG. 1.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention. The present invention provides an electrode extension guide that includes an arrangement of multiple, nonconductive bearings for properly guiding and electrically insulating a continuously fed electrode used in a welding process. With reference now to the Figures, one or more specific embodiments of this invention shall be described in greater detail.

FIGS. 1-3 provide various illustrative views of an electrode extension guide for use with welding systems in accordance with an exemplary embodiment of the present invention. Systems for arc welding typically include the use of a welding gun or the like (not shown in the figures) and an electrode, which in this embodiment is a continuously fed consumable electrode. The present invention is intended for use with arc welding systems and provides electrode extension guide 20, which is connected to contact tip 70, which is then connected to guide tube 80. An upper threaded portion 72 of contact tip 70 connects to guide tube 80 and a lower threaded portion 74 of contact tip 70 connects to electrode extension guide 20. Electrode 90 passes through guide tube 80, into and through contact tip 70, and then into and through electrode extension guide 20 toward base metals or work pieces to be welded together.

As best shown in FIGS. 2-3, an exemplary embodiment of electrode extension guide 20 further includes barrel 30, a plurality of spherical or substantially spherical bearings 50, and sleeve 60. Barrel 30 further includes an outer surface or outer diameter 32 and an inner surface or inner diameter 34, which defines a bore or channel 36 running lengthwise through electrode extension guide 20. A plurality of apertures 38 is formed in barrel 30, wherein the apertures are spaced at regular and/or staggered intervals relative to one another. Each aperture 38 extends from outer diameter 32 through to inner diameter 34 of barrel 30. In the exemplary embodiment shown in the Figures, each aperture 38 has been formed using a ball end mill for creating a tapered or curved surface 40 near the opening of the aperture into channel 36. A substantially spherical bearing 50 is inserted into each aperture 38 and the distance each bearing 50 extends into channel 36 is determined by curved surface 40, which makes the opening of each aperture 38 at inner diameter 34 smaller in size than the opening at outer diameter 32. Bearings 50 may be held in place by milling apertures 38 slightly smaller in diameter than the diameter of the bearings for allowing bearings 50 to be pressed into apertures 38 with an appropriate interference fit. Sleeve 60 is disposed around outer diameter 32 of barrel 30 along the length thereof, and is operative to retain bearings 50 within apertures 38 at outer diameter 32 of barrel 30. Sleeve 60 is typically shrink-fit around barrel 30, although other known attachment methodologies may be used.

In an exemplary embodiment, each bearing 50 is manufactured from an electrically non-conductive material such as, for example, silicon nitride, and barrel 30 and sleeve 60 may both be made of copper, copper alloy, or other suitable metal or material. Silicon nitride ball bearings provide desirable properties at high temperatures, including wear resistance, thermal shock resistance, and compressive strength. The compressive strength of silicon nitride is known to be in excess of 430,000 psi and its high resistance permits the press fitting of bearings 50 into barrel 30 with little or no failure. Furthermore, the use of a material having high compressive strength for nonconductive bearings 50 creates an electrode extension guide having a high resistance to mechanical failure. The relatively high ductility of copper compared to silicon nitride ball bearings permits the press fitting of bearings 50 into barrel 30. The overall length and the outer and inner diameters of barrel 30 (and sleeve 60) may be varied based on the type of welding system being used and on the specific applications of welding assembly 10.

As previously stated, electrode 90 passes entirely through the length of electrode extension guide 20. During a welding process, electrode 90 may lose some structural integrity and may flex or bend due to $I^2R$ heating, thus causing the electrode to wander from the intended point of welding. The placement of bearings 50 within barrel 30 and the distance between the tiers of bearings 50 is operative to minimize collapse of electrode 90, inhibit electrode 90 from deviating from a substantially straight path through barrel 30, and isolate electrode 90 from inadvertent electrical contact with any conductive material in barrel 30. The nonconductive pathway defined by bearings 50 provides a substantially cylindrical envelope that properly retains electrode 90 and prevents it from wandering to any significant degree without restricting passage of the electrode through extension guide 20, particularly when electrode 90 expands during heating. This is possible because a gap provided between bearings 50 permits variation in tolerance. For example, the inner most point of bearings 50 in an extension for guiding a 3/32 inch wire electrode would nominally be positioned to define a "circle" that is no greater than about 0.140 inch and no less than about 0.110 inch.

Electrode extension guide 20 permits electrode 90 to extend a predetermined length from contact tip 70 to the welding arc without additional electrical contact. Guidance by electrode extension guide 20 allows $I^2R$ heating to occur within electrode 90 while still being continuously fed and accurately positioned at the point of welding. As previously stated, the length of electrode extension guide 20 may vary depending upon the size, cross-section, and resulting electrical resistivity of electrode 90 and upon the desired increase in deposition rate. The exemplary embodiments of electrode extension guide 20 discussed herein are intended for use with up to 3 inches of a 3/32 inch diameter solid wire electrode. However, various other lengths are possible and can be used for different effects such as groove welding or overlays. Generally, the larger the wire (e.g. 5/32 inch), the longer the extension needs to be to obtain a certain percentage increase in burn off rate. Thus, in essence, the electrode extension guide of the present invention is scalable based on the length and diameter of the electrode with which it is being used.

In the exemplary embodiment shown in the Figures, bearings 50 are substantially or completely spherical; however, other shapes and geometries are possible. The size of bearings 50, the relative positions thereof in barrel 30, and the size of channel 36 are all coordinated with the size of electrode 90 to enable proper guidance of the electrode without jamming while still preventing electrical contact of the electrode with inner diameter 34. Bearings 50 are further operative to inhibit jamming of electrode 90 in barrel 30 caused by build-up of foreign material generated during welding. The use of a plurality of bearings 50 rather than a continuous cylinder creates physical space within the core of electrode extension guide 20 and both increases the resistance to wire jamming that may occur due to the buildup of foreign material within channel 36 and permits the release of such material when it is present.

In some embodiments of electrode extension guide 20, a flange (not shown in the Figures) may be included at one end of barrel 30 for facilitating the proper insertion of barrel 30 into sleeve 60. A deposition coating or additional bearings may be applied to or placed on the outer surface of sleeve 60 to make sleeve 60 electrically non-conductive. Additionally, electrode extension guide 20 may be cooled by water or by other means. Other modifications and adaptations are possible; for example, one exemplary embodiment is adapted to further protect the outside surface of sleeve 60 from electrically shorting to a weld joint sidewall. An appropriately sized, electrically insulating washer that withstands high temperatures is placed over barrel 30 and abutted against the bottom flange described above prior to placing sleeve 60 around barrel 30. The protrusion of this washer from the outer diameter of electrode extension guide 20 can be sized in relationship to the thickness of the flange to determine the included angle between the joint sidewall and the longitudinal axis of electrode extension guide 20 at which electrical contact will occur. For example, if the flange is ⅛ inch thick and the washer protrudes ⅛ inch, the maximum angle would be about 45 degrees. This one-to-one relationship of protrusion to flange thickness would be useful for most known applications.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A system for arc welding, comprising:
   (a) a welding gun, wherein the welding gun further includes an electrode guide tube, and a contact tip attached to the electrode guide tube;
   (b) an electrode extension guide connected to the contact tip, wherein the electrode extension guide further includes:
      (i) a barrel having a predetermined length, a predetermined outer diameter, a predetermined inner diameter, wherein the inner diameter further defines a channel passing lengthwise through the barrel, and a plurality of apertures formed therein, wherein each aperture in the plurality of apertures extends completely through the barrel from the outer diameter through to the inner diameter of the barrel where each aperture opens into the channel, and wherein each aperture includes a curved surface near the opening of the aperture into the channel;
      (ii) a plurality of substantially spherical bearings, wherein each bearing in the plurality of substantially spherical bearings is inserted into one of the apertures formed in the barrel such that the bearing extends a predetermined distance into the channel, wherein the predetermined distance is determined by the curved surface near the opening of the aperture into the channel, wherein each bearing is electrically non-conductive, and wherein the plurality of substantially spherical bearings define an electrically non-conductive pathway through the channel; and
      (iii) a sleeve, wherein the sleeve is disposed around the outer diameter of the barrel along the length thereof, and wherein the sleeve is operative to retain the bearings within the apertures at the outer diameter of the barrel; and
   (c) an electrode, wherein the electrode passes through the electrode guide tube, contact tip, and electrode extension guide; and
   (d) wherein the plurality of substantially spherical bearings is operative to minimize collapse of the electrode, inhibit the electrode from deviating from a substantially straight path through the barrel, and isolate the electrode from inadvertent electrical contact with any conductive material in the barrel.
2. The system of claim 1, wherein the barrel and sleeve are manufactured from copper.
3. The system of claim 1, wherein the bearings are manufactured from silicon nitride.
4. The system of claim 1, wherein the sleeve is shrink-fit around the outer diameter of the barrel.
5. The system of claim 1, wherein the electrode is a consumable electrode.
6. The system of claim 1, wherein the electrode is a continuously-fed electrode.
7. The system of claim 1, wherein the plurality of substantially spherical bearings is further operative to inhibit jamming of the electrode in the barrel caused by build-up of foreign material generated during welding.
8. An assembly for arc welding, comprising:
   (a) an electrode guide tube adapted to be connected to a welding gun;
   (b) a contact tip attached to the electrode guide tube; and
   (c) an electrode extension guide connected to the contact tip, wherein the electrode extension guide further includes:
      (i) a barrel having a predetermined length, a predetermined outer diameter, a predetermined inner diameter, wherein the inner diameter further defines a channel passing lengthwise through the barrel, and a plurality of apertures formed therein, wherein each aperture in the plurality of apertures extends completely through the barrel from the outer diameter through to the inner diameter of the barrel where each aperture opens into the channel, and wherein each aperture includes a curved surface near the opening of the aperture into the channel;
      (ii) a plurality of substantially spherical bearings, wherein each bearing in the plurality of substantially spherical bearings is inserted into one of the apertures formed in the barrel such that the bearing extends a predetermined distance into the channel, wherein the predetermined distance is determined by the curved surface near the opening of the aperture into the channel, wherein each bearing is electrically non-conductive, and wherein the plurality of substantially spherical bearings define an electrically non-conductive pathway through the channel; and
      (iii) a sleeve, wherein the sleeve is disposed around the outer diameter of the barrel along the length thereof, and wherein the sleeve is operative to retain the bearings within the apertures at the outer diameter of the barrel.
9. The assembly of claim 8, wherein the barrel and sleeve are manufactured from copper.
10. The assembly of claim 8, wherein the bearings are manufactured from silicon nitride.
11. The assembly of claim 8, wherein the sleeve is shrink-fit around the outer diameter of the barrel.
12. An electrode extension guide for use with arc welding systems, comprising:
   (a) a barrel having a predetermined length, a predetermined outer diameter, a predetermined inner diameter, wherein the inner diameter further defines a channel passing lengthwise through the barrel, and a plurality of apertures formed therein, wherein each aperture in the plurality of apertures extends completely through the barrel from the outer diameter through to the inner diameter of the barrel where each aperture opens into the channel, and wherein each aperture includes a curved surface near the opening of the aperture into the channel;
   (b) a plurality of substantially spherical bearings, wherein each bearing in the plurality of substantially spherical bearings is inserted into one of the apertures formed in the barrel such that the bearing extends a predetermined distance into the channel, wherein the predetermined distance is determined by the curved surface near the opening of the aperture into the channel, wherein each bearing is electrically non-conductive, and wherein the plurality of substantially spherical bearings define an electrically non-conductive pathway through the channel; and (c) a sleeve, wherein the sleeve is disposed around the outer diameter of the barrel along the length thereof, and wherein the sleeve is operative to retain the bearings within the apertures at the outer diameter of the barrel.

13. The electrode extension guide of claim 12, wherein the barrel and sleeve are manufactured from copper.

14. The electrode extension guide of claim 12, wherein the bearings are manufactured from silicon nitride.

15. The electrode extension guide of claim 12, wherein the apertures are located in a staggered pattern relative to one another.

16. The electrode extension guide of claim 12, wherein the apertures are located in a uniform pattern relative to one another.

17. The electrode extension guide of claim 12, wherein the sleeve is shrink-fit around the outer diameter of the barrel.

* * * * *